United States Patent [19]

Inoue et al.

[11] Patent Number: 4,865,446

[45] Date of Patent: Sep. 12, 1989

[54] LASER POWER AND ENERGY METER

[75] Inventors: Takemi Inoue; Ichiro Yokoshima, both of Tsukuba, Japan

[73] Assignee: Agency of Industrial Science & Technology, Ministry of International Trade, Tokyo, Japan

[21] Appl. No.: 167,121

[22] Filed: Mar. 11, 1988

[30] Foreign Application Priority Data

Jun. 25, 1987 [JP] Japan ................................ 62-158512

[51] Int. Cl.$^4$ ............................ G01J 1/00; G01J 5/00
[52] U.S. Cl. ..................................... 356/216; 356/218; 374/32
[58] Field of Search ...................... 374/32, 2; 356/218, 356/222, 226, 216; 250/352

[56] References Cited

U.S. PATENT DOCUMENTS 4,243,888 1/1981 Gruhn et al. ......................... 374/32
4,474,468 10/1984 Shirakura et al. .................. 356/222

Primary Examiner—Edward P. Westin
Attorney, Agent, or Firm—Oblon, Spivak, McClelland, Maier & Neustadt

[57] ABSTRACT

A laser power and energy meter has a target surface provided with at least one pin hole for passing a small portion of the laser beam impinging thereon and further has a light detector positioned in the path of the laser light passing through the pin hole. The target surface is moved horizontally and vertically to cause the laser beam to scan the target surface and the center of the laser beam is aligned with the center of the target surface.

7 Claims, 2 Drawing Sheets

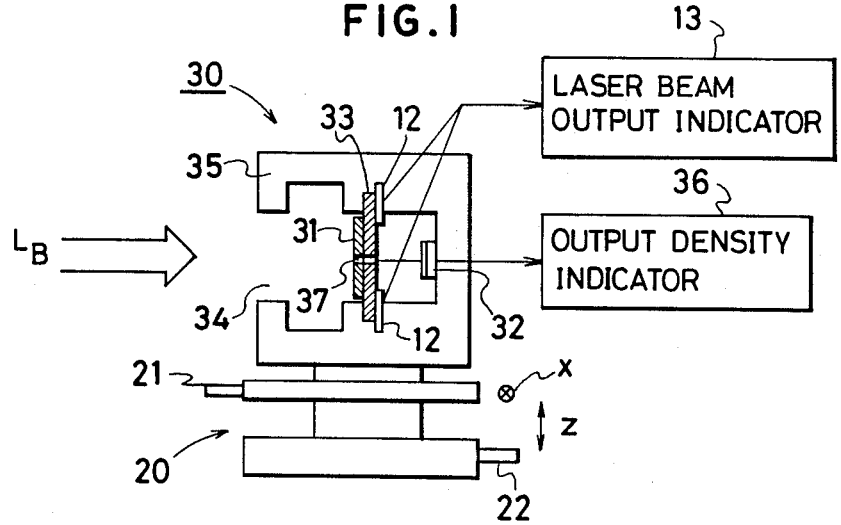
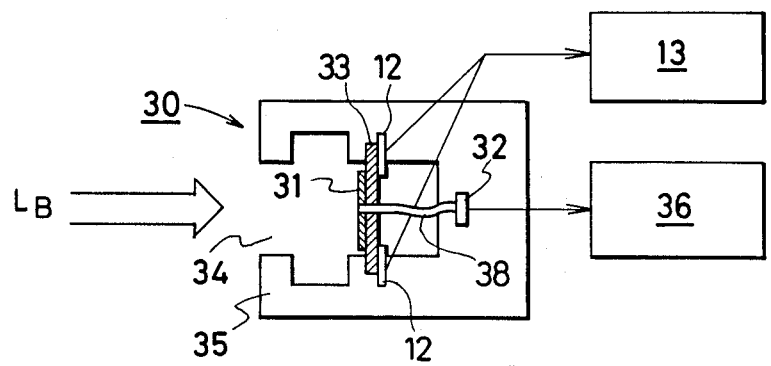
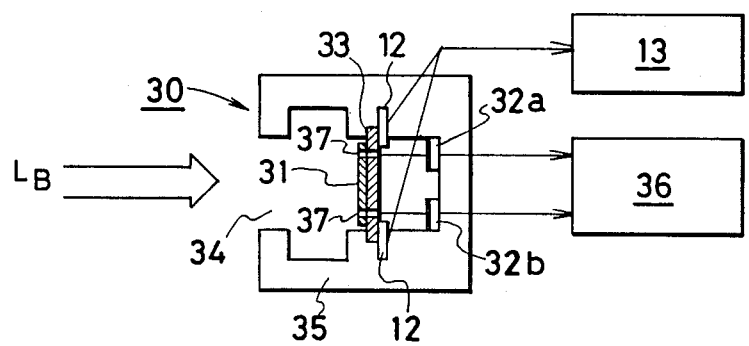

LASER POWER AND ENERGY METER

BACKGROUND OF THE INVENTION

1. Field of the Invention

This invention is directed to a laser power and energy meter.

2. Prior Art Statement

Solid-state, gas, semiconductor and other types of lasers are extensively employed in industry for producing laser beams used in such wide ranging fields as machining, medicine and communications. In such applications, it is necessary to be able to accurately measure the power of the laser beam that is emitted by the laser.

For this purpose, there have been developed laser output meters which measure the laser beam output using some type of heat sensor such as a thermopile, calorimeter, or pyroelectric sensor. However, when such a meter is used to measure the laser output, it is first necessary to cause the laser beam to impinge accurately on the target surface of the light receiver of which the heat sensor (hereinafter referred to as "laser output sensor") constitutes a part.

This is very difficult unless some special measure is taken because the laser beam is, in the first place, a spatially transmitted wave and, moreover, is frequently a beam outside the visible range or a pulsating beam. In the conventional laser output meters, this problem has been coped with by using an arrangement such as shown in Figure 4.

In FIG. 4, reference numeral 10 denotes a conventional laser output meter. The laser beam $L_B$ to be measured enters a blind hole in a light receiver housing 15 from an opening at one end thereof and impinges on the target surface 11 of a laser output sensor 12 positioned at the bottom of the blind hole. The laser output sensor 12 converts the light energy received thereby into an appropriate quantity of electricity which is used to produce a reading corresponding to the laser beam output on an indicator 13. The light receiver housing 15 enclosing the aforesaid components is mounted on a two-dimensional transfer table 20 which comprises micrometers 21 and 22 enabling it to be moved with high resolution in the Z direction (height direction) and the X direction (perpendicularly to the direction of the laser beam, within a horizontal plane).

When measurement is to be conducted, the laser beam to be measured is directed into the opening of the light receiver housing 15 and the micrometers 21, 22 are operated to move the two-dimensional transfer table 20 and the light receiver housing 15 by fine increments in the Z and X directions while observing the reading on the indicator 13. The micrometers 21, 22 are stopped at the positions giving the largest reading, which is taken to represent the laser output. Alternatively, a positioning plug 14 having a mark 16 on its head surface is screwed into the opening of the light receiver housing 15, the laser beam $L_B$ is directed onto the positioning plug 14 and the micrometers 21, 22 are operated to position the mark 16 with respect to the laser beam by observing the light reflected from the positioning plug 14. The positioning plug 14 is then removed to allow the laser beam $L_B$ enter the opening of the light receiver housing 15 and the laser beam power is read from the indicator 13.

However, where the method of adjusting the micrometers 21, 22 to obtain the maximum reading on the indicator 13 is used with a laser output sensor 12 of the heat sensing type, it is not possible to obtain an accurate measurement since the time constant of such a sensor is as long as from a few to several seconds and this means that changes in the point of incidence of the laser beam are not immediately reflected in the output reading so that drift is introduced to reduce the accuracy. On the other hand, the method employing the positioning plug 14 relies on the human eye and is singularly unreliable since the accuracy obtainable depends almost wholly on the skill of the operator and will differ greatly from person to person. Moreover, it is a considerably dangerous method in that it can harm the eyes and, at any rate, is totally useless with a nonvisible or pulsating laser beam.

OBJECT AND SUMMARY OF THE INVENTION

An object of this invention is to provide a laser power and energy meter which enables the point of incidence of a laser beam whose power and energy are to be measured to be positioned with respect to a target surface easily and with high accuracy and thus enables highly accurate measurement of laser output.

For attaining the aforesaid object the present invention provides, in a laser power and energy meter in which the power and energy of a laser beam incident on a target surface of a thermal type laser output sensor are measured, the improved laser power and energy meter wherein the target surface has at least one pin hole or light waveguide at its light receiving side and a light detector positioned in the path of the laser beam exiting from the pin hole or positioned to face the output end of said light waveguide.

The laser beam power and energy meter of the present invention uses a thermal type laser output sensor for measuring the energy of a laser beam. The target surface of the sensor is provided with a pin hole or light waveguide so that in the first stage of the measurement when the laser beam is being positioned on the target surface, a portion of the laser beam of very small diameter is allowed to pass to the rear of the target surface. A light detector is provided to the rear of target surface at a position where it receives the small portion of the laser beam passing through the target surface. Thus when the target surface is appropriately incremented in the horizontal and vertical directions to cause scanning of the laser beam thereover, it becomes possible to obtain the intensity pattern of the laser beam and from this to determine the mode of the laser beam. As a result, the center of the laser beam following this mode can be determined with high accuracy. This means that high-precision positioning can be obtained between the laser beam and the target, whereby it becomes possible to measure the laser output with high accuracy.

Moreover, in the laser power and energy meter according to the present invention, only a very small portion of the overall energy of the laser beam (i.e. only a very small portion of the overall area of the laser beam) is used for the initial positioning operation so that it is possible to use a light detector with rapid response such as a photodiode or a phototransistor. As a result, the effect of drift can be substantially eliminated and the positioning operation can be carried out in a short time.

These and other objects and features of this invention will be better understood from the following detailed description made with reference to the drawings.

BRIEF DESCRIPTION OF THE DRAWINGS

FIG. 1 is a schematic view of a first embodiment of the laser power and energy meter according to the invention.

FIG. 2 is a schematic view of a second embodiment of the same.

FIG. 3 is a schematic view of a third embodiment of the same.

DESCRIPTION OF THE PREFERRED EMBODIMENTS

Figure 4:
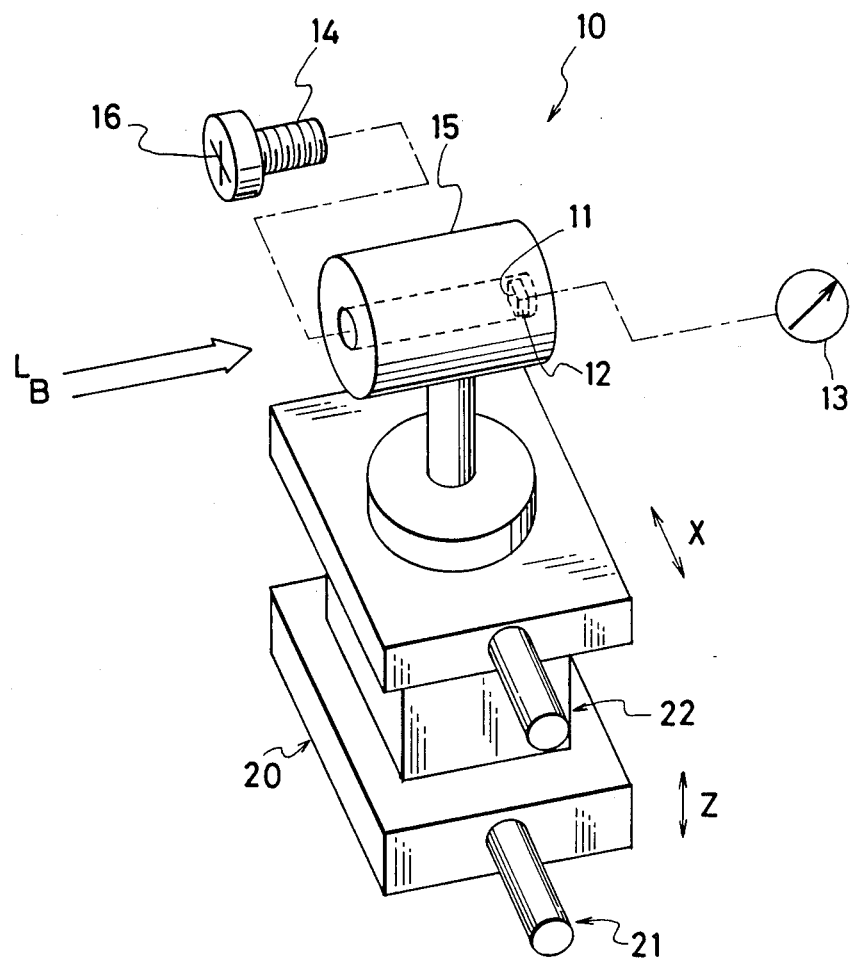
FIG. 4 is a schematic view of a conventional laser output meter.

FIG. 1 shows a first embodiment of the laser power and energy meter according to the present invention. The laser power and energy meter 30 has a light receiving housing 35 with an opening 34 at one end thereof. The laser beam $L_B$ to be measured is directed into the light receiving housing 35 through this opening 34.

On an appropriate substrate member 33 within the light receiving housing 35 there is mounted a target surface 31 for receiving the entire cross-sectional area of the laser beam $L_B$, and behind the substrate member 33 is provided a laser output sensor 12 which may be a thermopile, a calorimeter, a pyroelectric sensor or the like. The output of the laser output sensor 12 is sent to an indicator 13 from which the magnitude thereof can be read.

For enabling positioning of the light receiving housing 35, the target surface 31 is provided at its center with a pin hole 37. Thus a portion of the laser beam $L_B$ impinging on the target surface 31 passes through the pin hole 37 to the rear of the target surface 31 and impinges on a light detector 32 which is used for positioning and is disposed to have its light receiving surface on an extension of the axis of the pin hole 37. The light impinging on the light detector 32 is photoelectrically converted and the resulting quantity of electricity is used to obtain an indication of the output density of the impinging laser beam on a density indicator 36, which may be an oscilloscope or other known type of indicator. An oscilloscope is used particularly in the case of a pulsated laser beam.

By making the diameter of the pin hole 37 smaller, it is possible to reduce that proportion of the entire laser beam impinging on the target which is used for the positioning operation. Thus, since the amount of light energy received by the light detector 32 is small, the device used as the light detector 32 need not necessarily be a thermal type sensor but can instead advantageously be a high-speed response photodiode, phototransistor or other light detector capable of functioning at low input level with rapid response.

As can be understood from the foregoing, in the laser power and energy meter 30 according to the invention, the area of the laser beam received and detected by the light detector 32 is only a fraction of the overall cross-sectional area of the laser beam $L_B$. Therefore, if the light receiving housing 35 is provided with a conventional two-dimensional transfer table so that it can be moved both in a horizontal direction X which is perpendicular to the traveling direction of the laser beam $L_B$ and in the vertical direction Z, the resulting scanning of the laser beam $L_B$ over the target surface 31 will make it possible to obtain the intensity pattern of the laser beam $L_B$ entering the light receiving housing 35. It thus becomes possible to determine the center of the laser beam $L_B$ with high precision. Therefore, by adjusting the position of the laser power and energy meter 30 with respect to the laser beam $L_B$ and thereafter measuring the laser beam $L_B$ with the laser output sensor 12, it becomes possible to measure the laser output with high accuracy.

The initial positioning operation conducted when the laser power and energy meter 30 is used will now be explained in more detail. First, an explanation will be made for the case where the laser beam $L_B$ is of the simplest configuration, namely, for the case where the laser beam $L_B$ is a Gauss beam and consequently of $TEM_{oo}$ mode.

In a Gauss beam, where the beam radius is w and the intensity (output density) at the center of the beam is $I_o$, the beam intensity I at a distance r from the center is $$I = I_o \times exp(-2r^2/w^2) \tag{1}$$

From this it can be found that the relationship between the output energy component P within the area of radius r and the total energy $P_o$ is $$P = P_o\{1 - exp(-2r^2/w^2)\} \tag{2}$$

Therefore, if the diameter 2w of the laser beam is 1.5 mm and it is desired to hold the energy component P passing through the pin hole 37 to a maximum of 0.1% of the total energy $P_o$, namely where $$P/P_o \leq 10^{-3} \tag{3}$$

the required diameter 2r of the pin hole 37 can be found from equations (2) and (3) above to be $$2r \leq 33.5 \ \mu m \tag{4}$$

Thus the cross-section pattern of a Gauss beam is such that the intensity is maximum at the center and decreases steadily toward the periphery. Therefore, if the diameter of the pin hole 37 is made adequately small in the manner described above, and scanning is conducted by moving the laser power and energy meter 30 in the X and Z directions while at the same time monitoring the output of the light detector 32 (which should preferably exhibit rapid response and high sensitivity) on the density indicator 36, it is possible to determine that the laser beam incident on the target surface 31 is a Gauss beam. Once this knowledge has been obtained, it becomes an extremely simple matter to determine the center of the laser beam and a highly accurate reading of the laser output can be obtained on the indicator 13 even when a thermal type laser output sensor with a long time constant is used as the laser output sensor 12.

In this case, the error in positioning is not greater than the diameter of the pin hole 37 and thus can be held to a maximum value of 33.5 $\mu m$ while the error arising from the portion of the laser beam passing through the pin hole 37 is not more than 0.1%.

In a case where the diameter of the pin hole 37 has to be made large because the sensitivity of the light detector 32 is low, degradation of the measurement accuracy can be avoided by using a calibrated detector as the light detector 32 and taking as the measured value the sum of the output of the light detector 32 and the reading of the indicator 13, or the sum of the reading of the indicator 13 and a given compensation value.

Also, even where there is used a separate light detector which has been calibrated beforehand, the calibration accuracy need not be so high as in conventional laser output meters but, in principle, need only be equal to $P_o/P$.

It is obvious from the foregoing that the laser power and energy meter 30 according to the invention is also able to provide the same high positioning accuracy when the laser beam $L_B$ is of a different mode from the Gauss mode discussed above.

For example, even in the case of a laser beam following the $TEM_{10}$ mode in which a pair of peaks appear one on the left and one on the right, it is possible to determine that laser beam being received follows the $TEM_{10}$ mode by obtaining the intensity distribution in the X direction. In this case too, therefore, high-precision positioning can be realized.

FIG. 2 shows a second embodiment of the laser power and energy meter according to this invention. In this embodiment, instead of providing a pin hole in the target surface 31 an optical fiber light waveguide 38 is disposed with its light receiving end at the target surface 31. The light emitting end of the light waveguide 38 is disposed to face the light detector 32. With this arrangement, only that portion of the laser beam impinging on the target surface 31 which strikes the light receiving end of the light waveguide 38 is passed to the light detector 32 for use in positional detection. As in the first embodiment, the intensity distribution of the laser beam can be determined by moving the light receiving housing 35 in the X and Z directions and, based on this so-determined distribution, the position with respect to the laser beam $L_B$ can be accurately adjusted.

Moreover, with the arrangement according to this embodiment, the light detector 32 can, if convenient, be disposed outside the light receiving housing 35 and the portion of the laser beam for positional detection can be led thereto by the light waveguide 38. This is convenient in cases where the interior of the light receiving housing 35 is under a vacuum or there is insufficient room in the light receiving housing 35 for the light detector 32.

In the third embodiment of the invention shown in FIG. 3, the laser power and energy meter 30 has a plurality of pin holes 37 provided at prescribed positions (e.g. at equal distances from the center of the target surface 31) and the portions of the laser beam passing therethrough are detected by respective light detectors 32a, 32b . . .

This embodiment of the laser power and energy meter can be applied with good effect in cases where a large diameter laser beam is to be detected or where the amount of light passing through the target surface 31 tends to be insufficient. Also, since a separate light detector is provided for each pin hole, measurement of the beam profile can be carried out more rapidly.

It is of course possible to replace all or a part of the pin holes in this embodiment with light waveguides 38 like those employed in the embodiment of FIG. 2. Moreover, instead of providing a separate detector for each pin hole or light waveguide, it is possible to provide a common detector for all pin holes and waveguides.

As explained in the foregoing, the laser power and energy meter according to this invention uses only a very small fraction of the laser beam impinging on the target surface for carrying out positioning with respect to the laser beam and enables determination of the center of the laser beam rapidly and with high precision. As a result, it greatly enhances the reliability with which laser output can be measured.

What is claimed is:

1. A laser power and energy meter for measuring the power and energy of a laser beam incident on a target surface of a thermal type laser output sensor, comprising:
    guiding means provided on said target surface for guiding a cross-sectional portion of the laser beam through said target surface, and
    detector means for receiving said cross-sectional portion of the laser beam and for outputting information which causes said target surface to be positioned such that the center of the laser beam is aligned with the center of the target surface.

2. A laser power and energy meter according to claim 1, wherein said guiding means is at least one pin hole provided in said target surface.

3. A laser power and energy meter according to claim 1, wherein said guiding means is at least one light waveguide having a light receiving end at the target surface and having a light emitting end facing said detector means.

4. A laser power and energy meter according to claim 1 wherein said detector means comprises a thermal type sensor.

5. A laser power and energy meter according to claim 1, wherein said detector means comprises a photodiode.

6. A laser power and energy meter according to claim 1, wherein said detector means comprises a phototransistor.

7. A laser power and energy meter according to claim 1, further comprising:
    moving means for incrementally moving said target surface vertically and horizontally with respect to the laser beam so as to position said target surface such that the center of the laser beam is aligned with the center of said target surface, said moving means acting on said information from said detector means.

* * * * *

UNITED STATES PATENT AND TRADEMARK OFFICE
CERTIFICATE OF CORRECTION

PATENT NO. : 4,865,446

DATED : Sep. 12, 1989

INVENTOR(S) : Takemi Inoue, et al

It is certified that error appears in the above-identified patent and that said Letters Patent is hereby corrected as shown below:

On the title page:

The Assignee is recorded incorrectly, "Agency of Industrial Science & Technology, Ministry of International Trade" should be:

--Agency of Industrial Science & Technology, Ministry of International Trade & Industry--

Signed and Sealed this

Fourteenth Day of August, 1990

Attest:

HARRY F. MANBECK, JR.

*Attesting Officer*   *Commissioner of Patents and Trademarks*